(12) United States Patent
Cho et al.

(10) Patent No.: US 12,055,437 B2
(45) Date of Patent: Aug. 6, 2024

(54) SPECTROMETER AND IMAGING DEVICE

(71) Applicant: ANSWERAY INC., Gyeonggi-do (KR)

(72) Inventors: Seong Ho Cho, Gyeonggi-do (KR); Gajendra Pratap Singh, Uttar Pradesh (IN)

(73) Assignee: ANSWERAY INC., Gyeonggi-do (KR)

( * ) Notice: Subject to any disclaimer, the term of this patent is extended or adjusted under 35 U.S.C. 154(b) by 263 days.

(21) Appl. No.: 17/637,753

(22) PCT Filed: Aug. 23, 2019

(86) PCT No.: PCT/KR2019/010817
§ 371 (c)(1),
(2) Date: Feb. 23, 2022

(87) PCT Pub. No.: WO2021/040063
PCT Pub. Date: Mar. 4, 2021

(65) Prior Publication Data
US 2022/0283028 A1  Sep. 8, 2022

(30) Foreign Application Priority Data

Aug. 23, 2019 (KR) .................. 10-2019-0104031

(51) Int. Cl.
*G01J 3/28* (2006.01)
*G01J 3/02* (2006.01)

(52) U.S. Cl.
CPC .......... *G01J 3/2823* (2013.01); *G01J 3/0208* (2013.01); *G01J 3/0216* (2013.01); *G01J 3/0291* (2013.01)

(58) Field of Classification Search
CPC ...... G01J 3/2823; G01J 3/0208; G01J 3/0216; G01J 3/0291; G01J 3/021; G01J 3/1804;
(Continued)

(56) References Cited

U.S. PATENT DOCUMENTS

| 2005/0018187 A1* | 1/2005 | Slutter | G01J 3/0229 356/328 |
| 2007/0242268 A1* | 10/2007 | Dobschal | G01J 3/021 356/328 |

(Continued)

FOREIGN PATENT DOCUMENTS

| KR | 10-2011-0041175 A | 4/2011 |
| KR | 10-2014-0021620 A | 2/2014 |

(Continued)

OTHER PUBLICATIONS

Search Report received for PCT/KR2019/010817 dated May 20, 2020.

*Primary Examiner* — Tarifur R Chowdhury
*Assistant Examiner* — Akbar H. Rizvi
(74) *Attorney, Agent, or Firm* — MARSHALL, GERSTEIN & BORUN LLP

(57) ABSTRACT

A spectrometer that includes: a first diffraction grating configured to spectroscopically process provided light; a first detection unit configured to condense light spectroscopically processed by the first diffraction grating and to output an electrical signal corresponding to condensed light; a second diffraction grating configured to spectroscopically process $0^{th}$ order light provided by the first diffraction grating; and a second detection unit configured to condense light spectroscopically processed by the second diffraction grating and to output an electrical signal corresponding to condensed light.

28 Claims, 5 Drawing Sheets

(58) Field of Classification Search
CPC ....... G01J 2003/1217; G01J 2003/1273; G01J 3/18; G01J 3/06; G01J 2003/1204; G01J 2003/1842; G01N 21/25
See application file for complete search history.

(56) References Cited

U.S. PATENT DOCUMENTS

| | | | |
|---|---|---|---|
| 2012/0229813 A1* | 9/2012 | Kim | A61B 5/6852 |
| | | | 250/226 |
| 2016/0282282 A1* | 9/2016 | Quintanilha | G01N 21/956 |
| 2016/0341668 A1* | 11/2016 | Gupta | G01J 3/0237 |
| 2017/0059412 A1* | 3/2017 | Ye | G01J 3/4531 |
| 2017/0357155 A1* | 12/2017 | Quintanilha | G03F 7/2004 |

FOREIGN PATENT DOCUMENTS

| | | |
|---|---|---|
| KR | 10-2015-0086134 A | 7/2015 |
| KR | 10-2016-0063524 A | 6/2016 |
| KR | 10-2019-0015553 A | 2/2019 |

\* cited by examiner

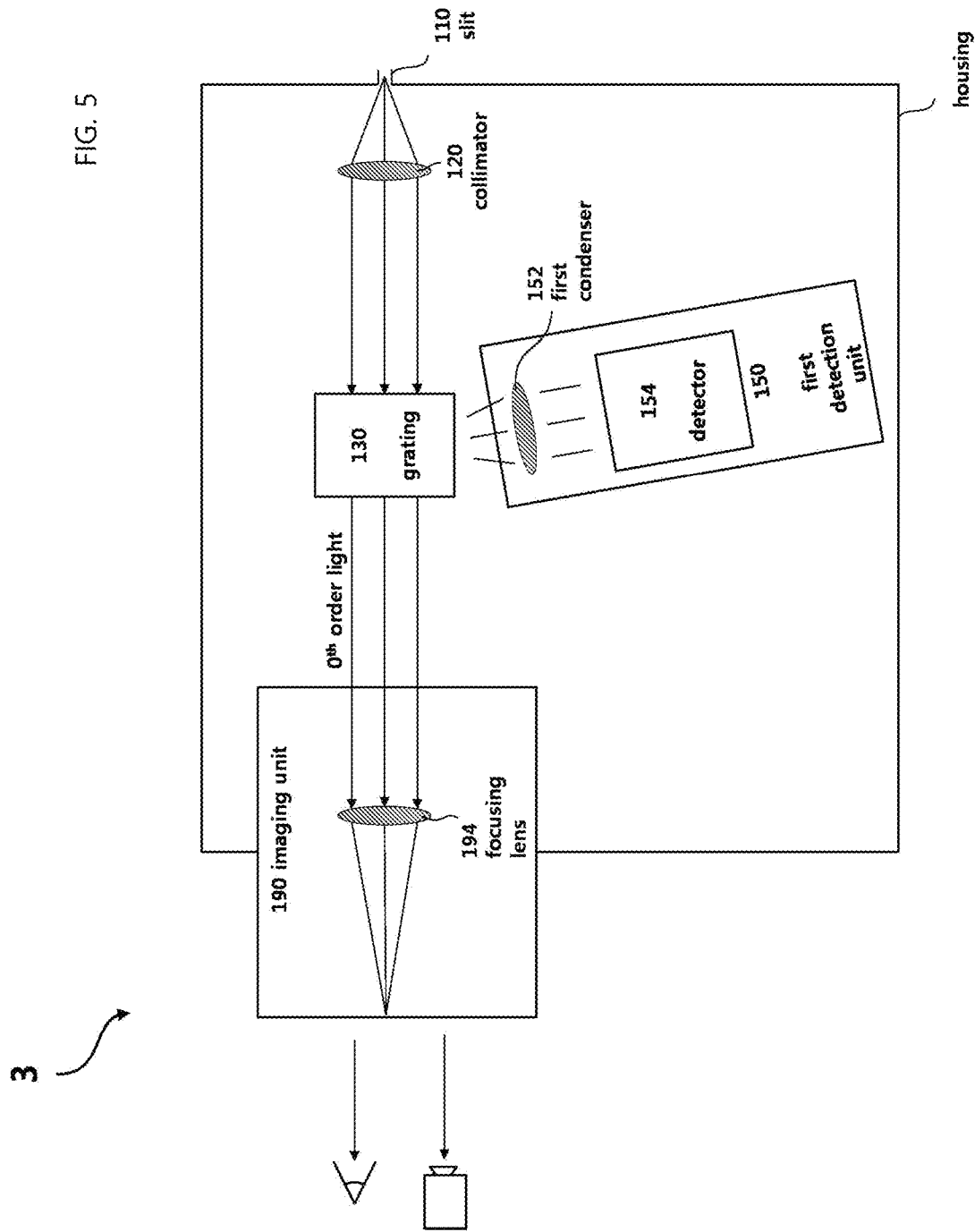

SPECTROMETER AND IMAGING DEVICE

FIELD OF THE INVENTION

The present technology relates to a spectrometer and an imaging device.

BACKGROUND OF THE INVENTION

A spectrometer refers to a device that decomposes light, that is, electromagnetic waves, absorbed or emitted by a target material into different wavelengths and measures an intensity distribution for each wavelength. The spectrometer may use a diffraction grating, a prism, an interferometer, a filter, or the like to disperse electromagnetic waves for each wavelength.

A conventional spectrometer is designed and configured to output a light of a specific order having the strongest intensity with respect to input light.

The conventional spectrometer is designed and manufactured so that an intensity of the light of a predetermined specific order is large, so that the light of another undesired order is not spectroscopically processed, nor is subject to perform other processing.

SUMMARY OF THE INVENTION

Technical Problem

Accordingly, the present disclosure has been made keeping in mind the above problems occurring in the related art. Specifically, in a conventional spectrometer, a ratio of light discarded without being spectroscopically processed is high, and when it is necessary to perform processing in various ways with provided light, a processing procedure needs to be performed several times, which is cumbersome and takes a long time.

The present embodiment is intended to solve the above-described disadvantages of the related art and to provide a spectrometer capable of performing a plurality of processing cases with the same light. In addition, the present embodiment is intended to provide an imaging device capable of performing imaging simultaneously with spectroscopic processing with the same light.

Technical Solution

In order to accomplish the above objective, there may be provided a spectrometer according to a present embodiment, the spectrometer including: a first diffraction grating configured to spectroscopically process provided light; a first detection unit configured to condense light spectroscopically processed by the first diffraction grating and to output an electrical signal corresponding to condensed light; a second diffraction grating configured to spectroscopically process $0^{th}$ order light provided by the first diffraction grating; and a second detection unit configured to condense light spectroscopically processed by the second diffraction grating and to output an electrical signal corresponding to condensed light.

In one aspect of a present spectrometer embodiment, the first detection unit may include: a first condenser configured to condense light spectroscopically processed by the first diffraction grating; and a first detector configured to detect light condensed and provided by the first condenser and to output an electrical signal corresponding to detected light, and the second detection unit may include: a second condenser configured to condense the light spectroscopically processed by the second diffraction grating; and a second detector configured to detect light condensed and provided by the second condenser and to output an electrical signal corresponding to detected light.

In one aspect of the present spectrometer embodiment, the first detector and the second detector may be different from each other in at least one of characteristics in sensitivity, a detection wavelength band, and resolution.

In one aspect of the present spectrometer embodiment, the first detector and the second detector may have the same characteristics as each other in sensitivity, a detection wavelength band, and resolution.

In one aspect of the present spectrometer embodiment, the spectrometer may further include: a housing; and a slit configured to provide light into the housing.

In one aspect of the present spectrometer embodiment, the spectrometer may further include a collimator configured to form the light provided from the slit into parallel light and to provide the parallel light to the first diffraction grating.

In one aspect of the present spectrometer embodiment, the spectrometer may further include a light delivery unit configured to provide light provided from a target T to the slit, wherein the light delivery unit may include: an objective lens configured to condense the light provided from the target T; and a focusing lens configured to provide light condensed by the objective lens to the slit.

In one aspect of the present spectrometer embodiment, the first diffraction grating may be any one of a transmissive diffraction grating and a reflective diffraction grating, and the second diffraction grating may be any one of the transmissive diffraction grating and the reflective diffraction grating.

In one aspect of the present spectrometer embodiment, the first diffraction grating may include any one of a diffraction grating in a form of a concave mirror and a diffraction grating in a form of a convex lens.

In one aspect of the present spectrometer embodiment, the first diffraction grating and the second diffraction grating may be different from each other in resolution.

In one aspect of the present spectrometer embodiment, the first diffraction grating and the second diffraction grating may have the same resolution as each other.

In one aspect of the present spectrometer embodiment, the spectrometer may be configured to allow a position of the first detection unit to be adjusted with respect to the first diffraction grating.

In one aspect of the present spectrometer embodiment, the spectrometer may be configured to allow a position of the second detection unit to be adjusted with respect to the second diffraction grating.

There may be provided a spectrometer according to another embodiment, the spectrometer including: a diffraction grating configured to spectroscopically process provided light; a first detection unit configured to condense light spectroscopically processed by the diffraction grating and to output an electrical signal corresponding to condensed light; a reflection mirror configured to reflect $0^{th}$ order light output from the diffraction grating, back to the diffraction grating; and a second detection unit, wherein the diffraction grating may be configured to spectroscopically process light reflected by the reflection mirror and to provide spectroscopically processed light to the second detection unit.

In one aspect of the present spectrometer embodiment, the first detection unit may include: a first condenser configured to condense light spectroscopically processed by the diffraction grating; and a first detector configured to detect light condensed by the first condenser and to output detected light in an electrical signal, and the second detection unit may include: a second condenser configured to condense light, which is the reflected $0^{th}$ order light spectroscopically processed by the diffraction grating; and a second detector configured to detect light condensed by the second condenser and to output detected light in an electrical signal.

In one aspect of the present spectrometer embodiment, the first detector and the second detector may have the same characteristics as each other in sensitivity, a detection wavelength band, and resolution.

In one aspect of the present spectrometer embodiment, the first detector and second detector may be different from each other in any one of sensitivity, a detection wavelength band, and resolution.

In one aspect of the present spectrometer embodiment, the spectrometer may further include: a housing; a slit configured to provide light into the housing; and a collimator configured to modify the light provided from the slit into parallel light.

In one aspect of the present spectrometer embodiment, the spectrometer further comprises a light delivery unit configured to provide light provided from a target T to the slit, wherein the light delivery unit may further include: an objective lens configured to condense the light provided from the target T; and a focusing lens configured to provide light condensed by the objective lens to the slit.

In one aspect of the present spectrometer embodiment, the diffraction grating may be any one of a transmissive diffraction grating and a reflective diffraction grating In one aspect of the present spectrometer embodiment, the diffraction grating may include any one of a diffraction grating in a form of a concave mirror and a diffraction grating in a form of a convex lens.

In one aspect of the present spectrometer embodiment, the spectrometer may be configured to allow at least any one of a position, of the first detection unit, and a position, of the second diffraction grating, to be adjusted with respect to the diffraction grating.

There may be provided an imaging device according to a present embodiment, the imaging device including: a diffraction grating configured to spectroscopically process provided light; a detection unit configured to condense light spectroscopically processed by the diffraction grating and to output condensed light in an electrical signal; and an imaging unit configured to image $0^{th}$ order light output from the diffraction grating, wherein the imaging unit may include a focusing lens configured to focus the $0^{th}$ order light.

In one aspect of a present imaging device embodiment, the detection unit may include: a condenser configured to condense light spectroscopically processed by the diffraction grating; and a detector configured to detect light condensed by the condenser and to output detected light in an electrical signal.

In one aspect of a present imaging device embodiment, the spectrometer may further include: a housing; a slit configured to provide light into the housing; and a collimator configured to modify the light provided from the slit into parallel light.

In one aspect of a present imaging device embodiment, the diffraction grating may include any one of a diffraction grating in a form of a concave mirror and a diffraction grating in a form of a convex lens.

In one aspect of a present imaging device embodiment, the diffraction grating may be any one of a transmissive diffraction grating and a reflective diffraction grating.

In one aspect of a present imaging device embodiment, the imaging device may further include a light delivery unit configured to provide light provided from a target T to the slit, wherein the light delivery unit may include: an objective lens configured to condense the light provided from the target T; and a focusing lens configured to provide light condensed by the objective lens to the slit.

Advantageous Effects

As described above, according to a present embodiment, a spectrometer capable of performing two or more spectroscopic analyses with the same light is provided. In addition, according to the present embodiment, an imaging device capable of performing a spectroscopic analysis and imaging with the same light is provided.

BRIEF DESCRIPTION OF DRAWINGS

FIG. 5 is a block diagram showing an outline of an imaging device according to a third embodiment.

DETAILED DESCRIPTION OF THE DRAWINGS

First Embodiment

Figure 1:
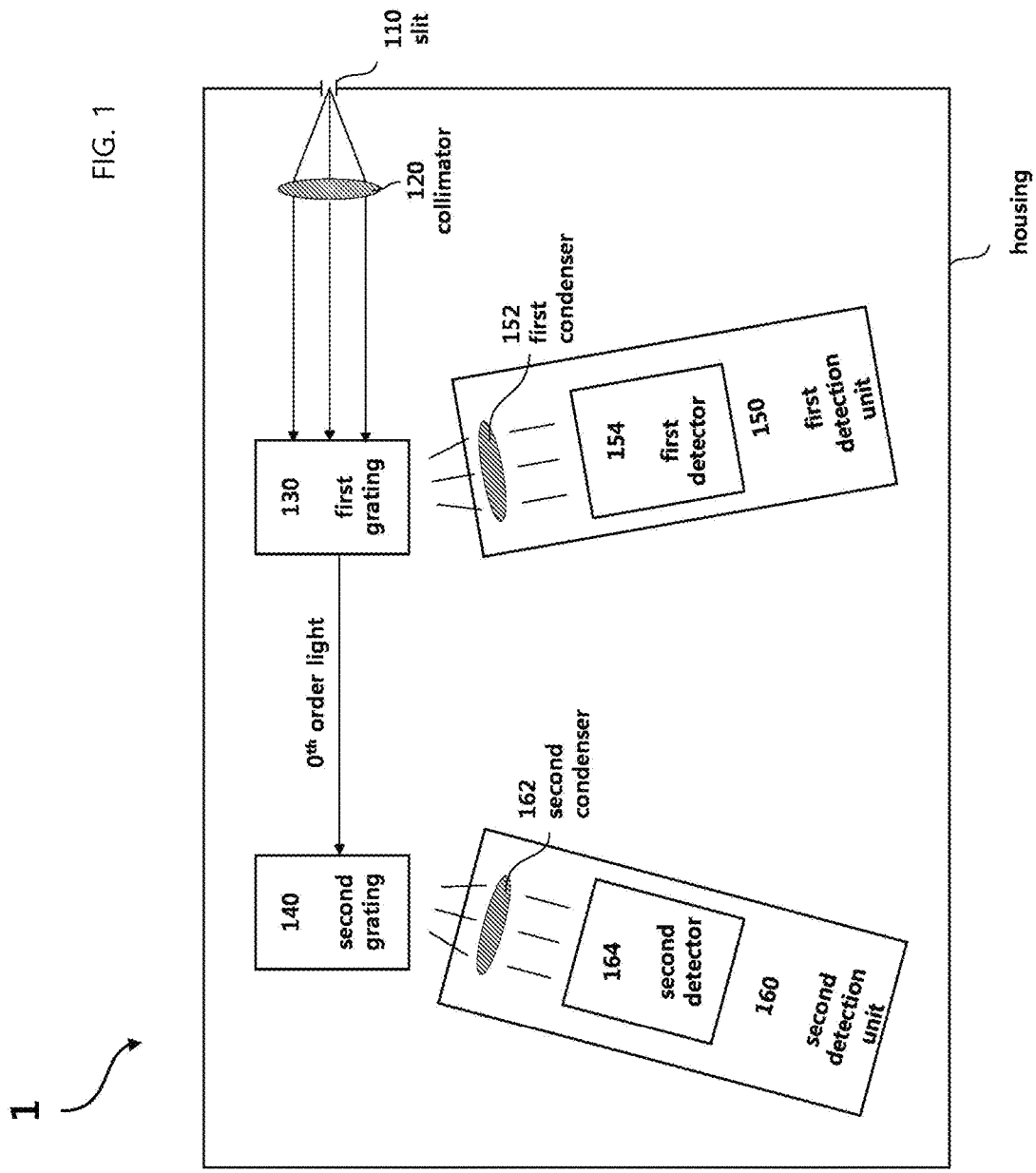
FIG. 1 is a block diagram showing an outline of a spectrometer according to a first embodiment.

Hereinafter, a spectrometer 1 according to the first embodiment will be described with reference to the accompanying drawings. FIG. 1 is a block diagram showing an outline of a spectrometer according to a first embodiment. With reference to FIG. 1, the spectrometer 1 according to the present embodiment includes: a first diffraction grating 130 configured to spectroscopically process provided light; a first detection unit 150 configured to condense light spectroscopically processed by the first diffraction grating 130 and to output an electrical signal corresponding to condensed light; a second diffraction grating 140 configured to spectroscopically process $0^{th}$ order light provided by the first diffraction grating; and a second detection unit 160 configured to condense light spectroscopically processed by the second diffraction grating 140 and to output an electrical signal corresponding to condensed light.

In one embodiment, the spectrometer 1 according to the present embodiment may further include a housing, wherein for example, the housing may have a light-blocking structure and thus shield an inner side thereof. In addition, the housing may include a slit 110 through which light to be spectroscopically processed is provided.

In the one embodiment, the first detection unit 150 includes: a first condenser 152 configured to condense light spectroscopically processed by the first diffraction grating 130; and a first detector 154 configured to be provided with light condensed by the first condenser and to detect provided light in order to output the detected light in an electrical signal corresponding to the detected light. In addition, the second detector 160 includes: a second condenser 162 configured to condense light spectroscopically processed by the second diffraction grating 140; and a second detector 164 configured to detect light condensed and provided by the second condenser 162 and to output an electrical signal corresponding to detected light.

Figure 2:
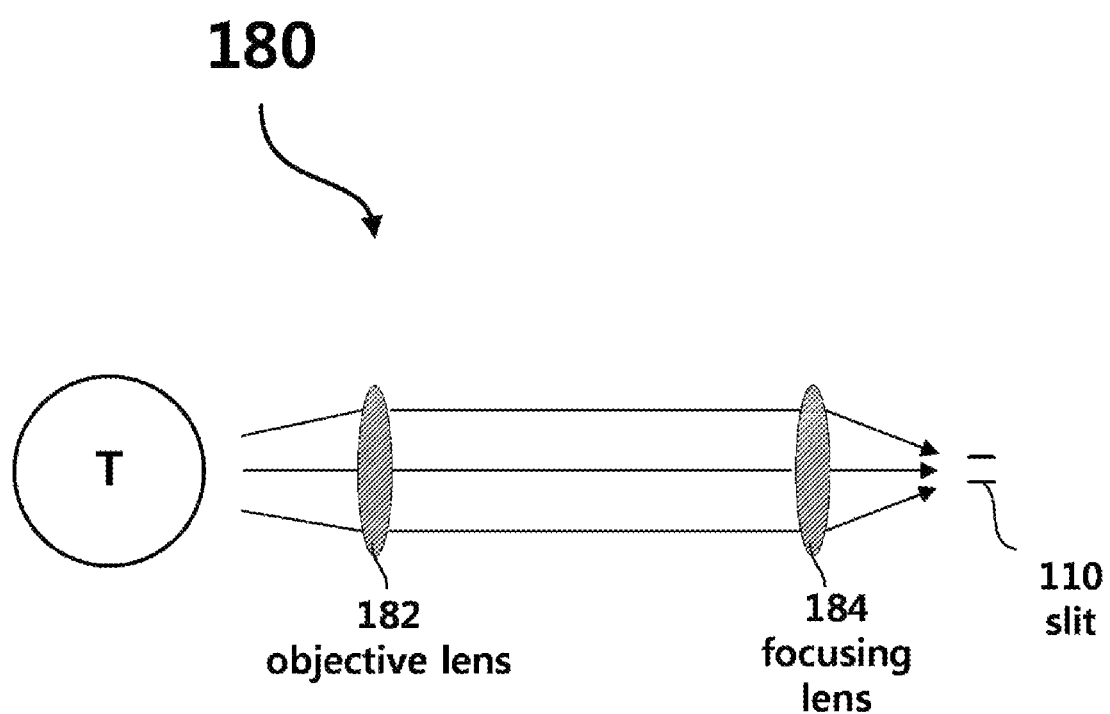
FIG. 2 is a view showing an outline of a light delivery unit according to the present embodiment.

FIG. 2 is a view showing an outline of a light delivery unit 180 according to the present embodiment. With reference to FIG. 2, the spectrometer 1 according to the present embodiment may further include a light delivery unit 180 configured to condense the light reflected from a target T and to provide the condensed light to the slit 110. Here, the light delivery unit 180 may include at least any one of an objective lens 182 configured to condense the light provided from the target T and a focusing lens 184 configured to provide light condensed by the objective lens 182 to the slit 110.

With reference again to FIG. 1, in the embodiment illustrated in FIG. 1, the spectrometer 1 includes a collimator 120. The light provided to the housing through the slit 110 is diffused by being diffracted or is diffused after being incident on the slit by being condensed, so the collimator 120 forms diffused light into parallel light to be provided to the first diffraction grating 130. According to an embodiment not shown, the spectrometer 1 may not include the collimator 120, and the light provided to the housing through the slit 110 may be condensed and spectroscopically processed by a reflective diffraction grating in a form of a concave mirror or a transmissive diffraction grating in a form of a convex lens.

Figure 3A:
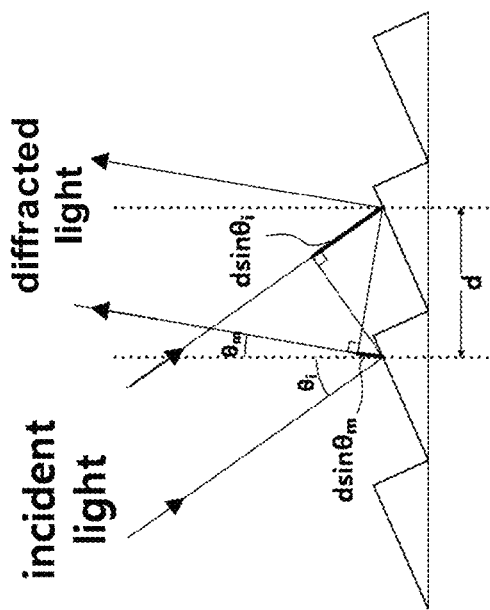
FIG. 3A is a view explaining an outline of an operation of a diffraction grating.
Figure 3B:
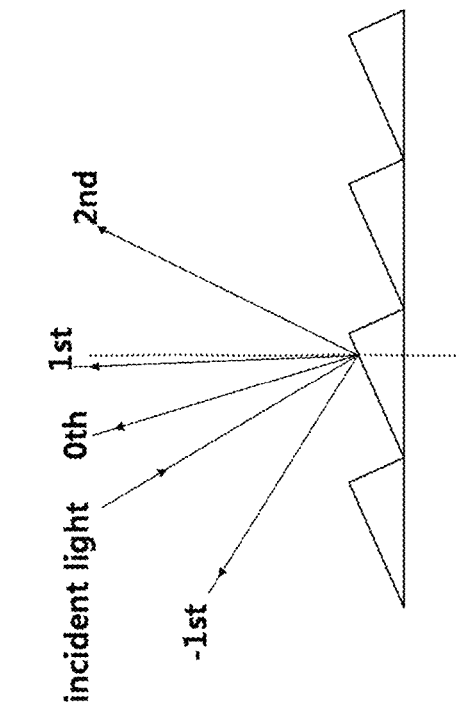
FIG. 3B is a view showing an outline explaining a reflective diffraction grating.
Figure 3C:
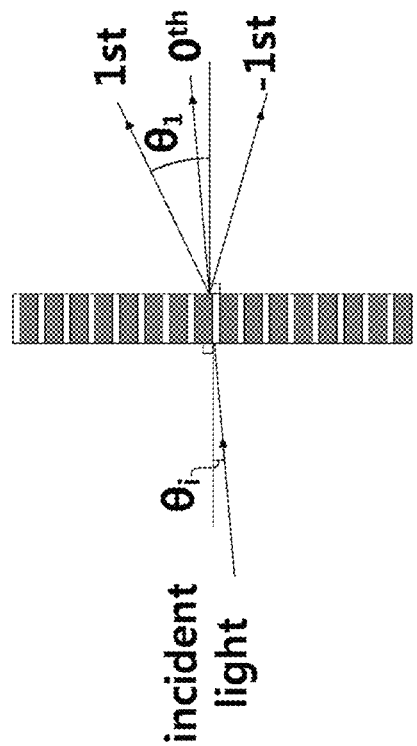
FIG. 3C is a view showing an outline explaining a transmissive diffraction grating.

FIG. 3A is a view explaining an outline of an operation of a diffraction grating, FIG. 3B is a view showing an outline explaining a reflective diffraction grating, and FIG. 3C is a view showing an outline explaining a transmissive diffraction grating. The diffraction grating may be divided into the transmissive type and the reflective type, and the diffraction grating illustrated in FIG. 3A is the reflective type. In a reflective diffraction grating, the light of various diffraction orders is formed by being reflected from the diffraction grating. When a difference between two adjacent diffracted light rays is an odd multiple of λ/2, destructive interference occurs and the diffracted light amplitude becomes the minimum, and when a difference between two adjacent diffracted light rays is an even multiple of λ/2, constructive interference occurs and the diffracted light amplitude becomes the maximum. Conditions in which the maximum diffracted light is generated, when generalized, may be expressed as following Equation 1.

$$m\lambda = d(\sin\theta_i - \sin\theta_m) \quad \text{[Equation 1]}$$

where d is a distance between the diffraction gratings, λ is a wavelength of incident light, $\theta_i$ is an angle of the incident light with respect to a diffraction grating plane, $\theta_m$ is an angle between the diffracted light and a vertical vector of the diffraction grating, and m is an integer value representing the order of the diffracted light.

FIG. 3B is a view showing an outline explaining a reflective diffraction grating, and FIG. 3C is a view showing an outline explaining a transmissive diffraction grating. With reference to FIG. 3B, in the reflective diffraction grating, $0^{th}$ order light is equal to reflection made on a mirror surface. That is, the reflection angle $\theta_m$ of the $0^{th}$ order light is equal to the incidence angle $\theta_i$ of the incident light. However, as the order increases, such as the first order light, the second order light, the third order light, and the like, the angle $\theta_m$ made by the light with respect to a normal line of the reflective surface increases. In addition, there may be (−) first order light, (−) second order light, and the like, and absolute values of the angles made by such light with respect to the normal line of the reflective surface equal to the values made by the first order light, second order light, third order light, and the like, respectively, but signs of the values of such angles are opposite, so such light is formed in an opposite direction with respect to the light having positive values with the incident light as a reference.

With reference to FIG. 3C, even when incident light is provided to the transmissive diffraction grating, light such as $0^{th}$ order light, first order light, and second order light, and the like are formed. The $0^{th}$ order light is the light penetrating through the transmissive diffraction grating, and the angle made by the $0^{th}$ order light with respect to the normal line of the transmissive surface of the diffraction grating is equal to the angle $\theta_i$ formed by the incident light with respect to the normal line of the transmissive diffraction grating surface.

Although not shown, as described above, the reflective diffraction grating may have a form of a concave mirror, and the transmissive diffraction grating may have a form of a convex lens. In this case, condensing and spectroscopic processing are possible without the collimator.

With reference to FIGS. 1 and 3, the light provided to the first diffraction grating 130 is spectroscopically processed and provided to the first light condenser 152. In the one embodiment, the first diffraction grating 130 spectroscopically processes the light provided through the slit 110 and provides light of a predetermined order to the first condenser 152. For example, the first condenser 152 may be disposed so as to correspond to an angle at which light of a specific order provided by the first diffraction grating 130 is provided, whereby a target light of a specific order may be condensed and provided to the first detector 154. An angle $\theta_m$ at which the light of a specific order m is provided may be expressed as Equation 2 below derived from Equation 1.

$$\theta_m = \sin^{-1}\left(\sin\theta_i - \frac{m\lambda}{d}\right) \quad \text{[Equation 2]}$$

In the embodiment in which the first diffraction grating 130 is the transmissive diffraction grating illustrated in FIG. 3C and the first light is to be spectroscopically processed, the first detection unit 150 is disposed to make an angle be equal to θ1 with respect to a normal line of the transmissive surface of the first diffraction grating 130, whereby a desired first light may be condensed.

The first condenser 152 condenses the light spectroscopically processed by the first diffraction grating 130 and provides same to the first detector 154. The first detector 154 forms and outputs an electrical signal corresponding to the condensed light.

The $0^{th}$ order light from the first diffraction grating 130 is provided to the second diffraction grating 140. The second diffraction grating 140 may be any one of the reflective diffraction grating and the transmissive diffraction grating illustrated in FIGS. 3A to 3C. In the embodiment illustrated in FIG. 1, the spectrometer 1 may have the first diffraction grating 130 and the second diffraction grating 140 having different characteristics from each other, whereby resolution of the first and second spectroscopic processing may be different. In another embodiment, the spectrometer 1 may have the first diffraction grating 130 and the second diffraction grating 140 having the same characteristics as each other.

The $0^{th}$ order light provided to the second diffraction grating 140 is spectroscopically processed by the second diffraction grating 140. The second detection unit 160 may be disposed to condense the light of a desired order from the second diffraction grating 140. The second light condenser 162 included in the second detection unit provides the condensed light to the second detector 164.

In the one embodiment, the first detector 154 and the second detector 164 may include elements such as a photodiode, CCD, CMOS, and the like that are configured to output an electrical signal corresponding to the light. The first detector 154 and the second detector 164 have characteristics of the resolution, a detection band, and a sensitivity, at least one of which is different from each other. Thus, it is possible to spectroscopically process the same light and to process spectroscopically processed light, thereby obtaining different features. In another embodiment, the first detector 154 and the second detector 164 have the characteristics of the resolution, detection band, and sensitivity that are the same as each other. For example, the first detector 154 and the second detector 164 may use the same detector to improve signal correction or signal-to-noise ratio.

In one embodiment, by spectroscopically processing by adjusting a position of the first detection unit 150 with respect to the first diffraction grating 130, it is possible to adjust an analysis target wavelength region, and by adjusting a position of the second detection unit 160 with respect to the second diffraction grating 140, it is possible to adjust an analysis target wavelength region to be spectroscopically processed. In addition, spectroscopic processing characteristics measured by each detector may be adjusted by varying measurement conditions of the first detector 154 and the second detector 164. For example, the signal-to-noise ratio measured by each of the first detector 154 and the second detector 164 may become different by varying a signal measurement time (detection time or integration time). In addition, the first detector 154 uses a Si semiconductor, and the second detector 164 uses an InGaAs semiconductor, wherein the Si detector may detect a wavelength of 1.1 μm or less, and the InGaAs semiconductor detector may detect a wavelength of 1.1 μm or greater.

The detection material of the first detector 154 and the second detector 164 may measure different wavelengths of ultraviolet, visible, infrared, and the like, the detection material being selected from semiconductor materials such as Si, Ge, InGaAs, GaN, GaAs, InAs, InGaAsP, PbS, PbSe, PtSi, InSb, Mercury Cadmium Telluride (MCT), HgCdTe, Mercury Zinc Telluride (MZT), HgZnTe, and the like and oxides such as vanadium pentoxide and the like.

FIG. 1 shows an example of using two diffraction gratings, but a configuration, in which the $0^{th}$ order light provided from the second diffraction grating is spectroscopically processed by a third diffraction grating, and the light spectroscopically processed is detected by a third detection unit, is also naturally possible. That is, when an intensity of the provided light is sufficient enough, three or more diffraction gratings and detection units may be provided, so that the spectroscopic processes and analyses may be performed with the same light a plurality of times.

In addition, the illustrated embodiment uses two diffraction gratings, so the resolution of the two detectors may be easily changed, and spectroscopic process conditions such as resolution, wavelength band, and the like may be adjusted by varying a photodiode array size or pixel pitch of the first and second detectors.

In the embodiment described above with reference to the drawings, the collimator 120, the first condenser 152, the second condenser 162, the objective lens 182, and the focusing lens 184 are all exemplified as convex lenses. However, such convex lenses may be used in combination with concave lenses in order to reduce an influence of non-ideal characteristics of the lens, such as chromatic aberration. In addition, the convex lens may be substituted with a concave mirror (or vice versa), and the concave lens may be substituted with a convex mirror (or vice versa).

Second Embodiment

Figure 4:
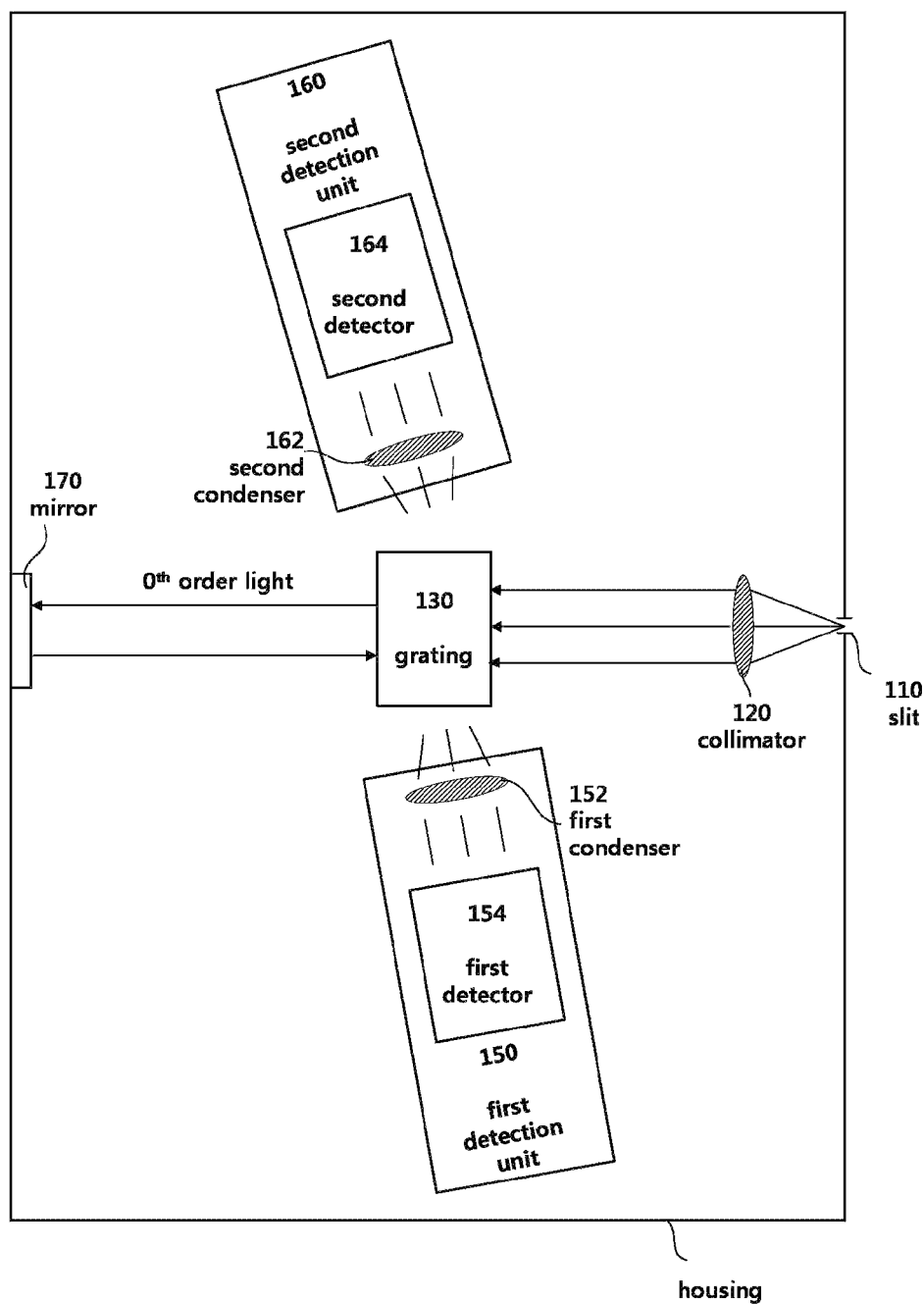
FIG. 4 is a block diagram showing an outline of a spectrometer according to a second embodiment.

Hereinafter, a spectrometer 2 according to the second embodiment will be described with reference to the accompanying drawings. For a simple and clear description, a description of elements that are the same as or similar to those described in the first embodiment may be omitted. FIG. 4 is a block diagram showing an outline of a spectrometer according to the second embodiment. With reference to FIG. 4, the spectrometer 2 according to the present embodiment includes: a diffraction grating 130 configured to spectroscopically process provided light; a first detection unit 150 configured to condense light spectroscopically processed by the diffraction grating 130 and to output an electrical signal corresponding to condensed light; a reflection mirror 170 configured to reflect 0th order light output from the diffraction grating 130 back to the diffraction grating 130; and a second detection unit 160, wherein the diffraction grating 130 is configured to spectroscopically process light reflected by the reflection mirror 170 and to provide spectroscopically processed light to the second detection unit 160.

In one embodiment, the spectrometer 2 according to the present embodiment may further include a housing, wherein for example, the housing may have a light-blocking structure and thus shield an inner side thereof. In addition, the housing may include a slit 110 through which the light to be spectroscopically processed is provided.

In the one embodiment, the first detection unit 150 includes: a first condenser 152 configured to condense light spectroscopically processed by the diffraction grating 130; and a first detector 154 configured to be provided with light condensed by the first condenser and to detect condensed light to output the detected light in an electrical signal corresponding to the detected light. In addition, the second detector 160 includes: a second condenser 162 configured to condense the light, which are the reflected $0^{th}$ order light that are spectroscopically processed by the diffraction grating 130; and a second detector 164 configured to detect light condensed and provided by the second condenser 162 and to output an electrical signal corresponding to detected light.

In one embodiment, the spectrometer 2 according to the present embodiment may further include a light delivery unit 180 (refer to FIG. 2) configured to condense the light provided from a target T to provide condensed light to the slit 110. Here, the light delivery unit 180 may include at least any one of an objective lens 182 configured to condense the light provided from the target T as described above and a condensing lens 184 configured to provide the light condensed by the objective lens 182 to the slit 110.

The light provided through the slit 110 are diffused after being incident on the slit by being condensed or diffused by being diffracted after being incident on the slit, so the spectrometer 2 may further include a collimator 120 that converts the diffused light into parallel light. According to another embodiment described above, when the diffraction grating 130 in the form of a concave mirror or the diffraction grating in the form of a convex lens is used, condensing and spectroscopic processing may be performed together, so the collimator 120 may not be necessary.

The diffraction grating 130 spectroscopically processes the light provided through the slit 110 to provide to the first detection unit 150. As described above, the first detection unit 150 is disposed at a position capable of detecting the light of a desired order among the light spectroscopically processed by the diffraction grating 130. The light spectroscopically processed by the diffraction grating 130 is provided to the first condenser 152, and the first detector 154 receives the light condensed and provided by the first condenser 152 and outputs an electrical signal corresponding to received light. The light provided by the diffraction grating 130 has angles provided according to the order, the angles being different from each other, so a position of the first detection unit 150 may be adjusted to receive the light of the desired order.

The $0^{th}$ order light provided by the diffraction grating 130 is reflected by the reflection mirror 170 and provided to the diffraction grating 130 again at a desired incident angle. The $0^{th}$ order light is incident on the diffraction grating 130 and is spectroscopically processed. The second detection unit 160 is disposed at a position capable of condensing the light of a desired order.

The first detector 154 and the second detector 164 may include elements such as CCD, CMOS, and the like that are configured to output an electrical signal corresponding to the light. The first detector 154 and the second detector 164 may have characteristics of resolutions, detection bands, and sensitivities, at least one of which is different from each other so as to simultaneously acquire a plurality of characteristics from the same light. In another embodiment, the first detector 154 and the second detector 164 may use the same detector, whereby signal correction or signal-to-noise ratio characteristics may be improved.

Although FIG. 4 shows an example of using a single reflection mirror and a single diffraction grating, it is naturally possible also to have a configuration in which the $0^{th}$ order light reflected by the reflection mirror is provided to the diffraction grating, and $0^{th}$ order light formed at this time is provided to the diffraction grating again by a second reflection mirror to be spectroscopically processed and is detected by a third detector. When an intensity of the provided light is sufficient enough, two or more reflection mirrors and detection units may be provided, so that the spectroscopic processes and analyses may be performed with the same light a plurality of times.

In the present embodiment the single diffraction grating is used, so it may be difficult to change the resolution of the first and second spectroscopic processing, but by varying a photodiode array size or pixel pitch of the first and second detectors, spectroscopic processing conditions such as resolution, sensitivity, spectroscopic area, and the like may be adjusted.

In the embodiment described above with reference to the drawings, the collimator 120, the first condenser 152, the second condenser 162, the objective lens 182, and the focusing lens 184 are all exemplified as convex lenses. However, such convex lenses may be used in combination with concave lenses in order to reduce an influence of non-ideal characteristics of the lens, such as chromatic aberration. In addition, the convex lens may be substituted with a concave mirror (or vice versa), and the concave lens may be substituted with a convex mirror (or vice versa).

Third Embodiment

Hereinafter, an imaging device 3 according to the third embodiment will be described with reference to the accompanying drawings. For a simple and clear description, a description of elements that are the same as or similar to those described in the first and second embodiments may be omitted. FIG. 5 is a block diagram showing an outline of the imaging device according to the third embodiment. With reference to FIG. 5, the imaging device 3 according to the present embodiment includes: a diffraction grating 130 configured to spectroscopically process provided light; a condenser 152 configured to condense the light spectroscopically processed by the diffraction grating 130, a detector 154 configured to detect light condensed by the condenser to output an electrical signal corresponding to detected light; and an imaging unit 190 configured to image $0^{th}$ order light output from the diffraction grating 130, wherein the imaging unit 190 includes: a condensing lens (not shown) configured to condense $0^{th}$ order light and a focusing lens 194 configured to collect light condensed by the condenser lens.

In one embodiment, the imaging device 3 according to the present embodiment may further include a light delivery unit 180 (refer to FIG. 2) configured to condense the light provided from a target T to provide the condensed light to the slit 110. Here, the light delivery unit 180 (refer to FIG. 2) may include as described above at least any one of an objective lens 182 (refer to FIG. 2) configured to condense the light provided from the target T and a focusing lens 184 (refer to FIG. 2) configured to provide the light condensed by the objective lens 182 (refer to FIG. 2) to the slit 110.

The condenser 152 is disposed to condense the light of a desired order from the diffraction grating 130. The condenser 152 is configured to condense the light of the desired order to provide to the detector 154, and the detector 154 is configured to output an electrical signal corresponding to provided light.

The diffraction grating 130 is configured to provide the $0^{th}$ order light to the imaging unit 190. The imaging unit 190 includes a focusing lens 194 configured to focus the provided $0^{th}$ order light. In the one embodiment, the diffraction grating 130 may have non-ideal characteristics, and consequently, the $0^{th}$ order light provided by the diffraction grating 130 may be diffused or condensed therefrom. For the purpose of correcting such non-ideal characteristics or reducing aberration, the imaging unit 190 may further include a condensing lens (not shown), and the condensing lens is configured to form the $0^{th}$ order light provided by being diffused or condensed from the diffraction grating 130 into the parallel light.

The imaging unit 190 is configured to image the light provided from the diffraction grating 130, thereby allowing imaged light to be provided for an ocular observation and/or photograph. In the one embodiment, the light imaged by the imaging unit 190 may be provided to a microscope for ocular observation of the target or may be provided to a photographing device for photographing the target. According to an embodiment not shown in FIG. 5, the imaging unit 190 may further include a beam splitter configured to allow the light provided by the focusing lens 194 to be split and the split light to be provided for the ocular observation and photograph.

Similar to the above-described embodiment of the spectrometer, the wavelength region to be analyzed may be adjusted by splitting the light by adjusting the position of a detection unit 150 with respect to the diffraction grating 130.

In the embodiment described above with reference to the drawings, the collimator 120, the condenser 152, the objective lens 182, and the focusing lens 184 are all exemplified as convex lenses. However, such convex lenses may be used in combination with concave lenses in order to reduce an influence of non-ideal characteristics of the lens, such as chromatic aberration. In addition, the convex lens may be substituted with a concave mirror (or vice versa), and the concave lens may be substituted with a convex mirror (or vice versa).

Although it has been described with reference to the embodiments shown in the drawings in order to help the understanding of the present disclosure, these are embodiments for implementation and merely examples. Accordingly, it will be appreciated by those of ordinary skill in the art that other embodiments having various modifications and equivalents of the above embodiments are possible. Accordingly, the true technical protection scope of the present disclosure should be defined by the appended claims.

The invention claimed is:

1. A spectrometer comprising:
a first diffraction grating configured to spectroscopically process provided light;
a first detection device configured to condense light spectroscopically processed by the first diffraction grating and to output an electrical signal corresponding to condensed light;
a second diffraction grating configured to spectroscopically process $0^{th}$ order light provided by the first diffraction grating; and
a second detection device configured to condense light spectroscopically processed by the second diffraction grating and to output an electrical signal corresponding to condensed light,
wherein the spectrometer is configured to allow a position of the first detection device to be adjusted with respect to the first diffraction grating such that a light of a predetermined order provided by the first diffraction grating is provided to the first detection device.

2. The spectrometer of claim 1, wherein the first detection device comprises:
a first condenser configured to condense light spectroscopically processed by the first diffraction grating; and
a first detector configured to detect light condensed and provided by the first condenser and to output an electrical signal corresponding to detected light, and
the second detection device comprises:
a second condenser configured to condense the light spectroscopically processed by the second diffraction grating; and
a second detector configured to detect light condensed and provided by the second condenser and to output an electrical signal corresponding to detected light.

3. The spectrometer of claim 2, wherein the first detector and the second detector are different from each other in at least one of characteristics in sensitivity, a detection wavelength band, and resolution.

4. The spectrometer of claim 2, wherein the first detector and the second detector have the same characteristics as each other in sensitivity, a detection wavelength band, and resolution.

5. The spectrometer of claim 1, wherein the spectrometer further comprises:
a housing; and
a slit configured to provide light into the housing.

6. The spectrometer of claim 5, wherein the spectrometer further comprises a collimator configured to form the light provided from the slit into parallel light and to provide the parallel light to the first diffraction grating.

7. The spectrometer of claim 5, wherein the spectrometer further comprises a light delivery unit configured to provide light provided from a target to the slit,
wherein the light delivery unit comprises:
an objective lens configured to condense the light provided from the target; and
a focusing lens configured to provide light condensed by the objective lens to the slit.

8. The spectrometer of claim 1, wherein the first diffraction grating is any one of a transmissive diffraction grating and a reflective diffraction grating, and
the second diffraction grating is any one of the transmissive diffraction grating and the reflective diffraction grating.

9. The spectrometer of claim 1, wherein the first diffraction grating includes any one of a diffraction grating in a form of a concave mirror and a diffraction grating in a form of a convex lens.

10. The spectrometer of claim 1, wherein the first diffraction grating and the second diffraction grating are different from each other in resolution.

11. The spectrometer of claim 1, wherein the first diffraction grating and the second diffraction grating have the same resolution as each other.

12. The spectrometer of claim 1, wherein the spectrometer is configured to allow a position of the second detection device to be adjusted with respect to the second diffraction grating.

13. The spectrometer of claim 1, wherein the spectrometer further comprises:
a third diffraction grating configured to spectroscopically process $0^{th}$ order light provided from the second diffraction grating; and
a third detection device configured to condense light spectroscopically processed by the third diffraction grating and to output an electrical signal corresponding to condensed light.

14. A spectrometer comprising:
a diffraction grating configured to spectroscopically process provided light;
a first detection device configured to condense light spectroscopically processed by the diffraction grating and to output an electrical signal corresponding to condensed light;
a reflection mirror configured to reflect $0^{th}$ order light output from the diffraction grating back to the diffraction grating; and
a second detection device,
wherein the diffraction grating is configured to spectroscopically process the $0^{th}$ order light reflected by the reflection mirror and to provide spectroscopically processed light to the second detection device,
wherein the spectrometer is configured to allow at least any one of a position, of the first detection device, and a position, of the second detection device, to be adjusted with respect to the diffraction grating such that a light of a predetermined order provided by the first diffraction grating is provided to the first detection device.

15. The spectrometer of claim 14, wherein the first detection device comprises:
a first condenser configured to condense light spectroscopically processed by the diffraction grating; and
a first detector configured to detect light condensed by the first condenser and to output detected light in an electrical signal, and
the second detection device comprises:

a second condenser configured to condense light, which is the reflected $0^{th}$ order light spectroscopically processed by the diffraction grating; and a second detector configured to detect light condensed by the second condenser and to output detected light in an electrical signal.

16. The spectrometer of claim 15, wherein the first detector and the second detector have the same characteristics as each other in sensitivity, a detection wavelength band, and resolution.

17. The spectrometer of claim 15, wherein the first detector and second detector are different from each other in any one of sensitivity, a detection wavelength band, and resolution.

18. The spectrometer of claim 14, wherein the spectrometer further comprises:
   a housing;
   a slit configured to provide light into the housing; and
   a collimator configured to modify the light provided from the slit into parallel light.

19. The spectrometer of claim 18, wherein the spectrometer further comprises a light delivery unit configured to provide light provided from a target T to the slit,
   wherein the light delivery unit comprises:
   an objective lens configured to condense the light provided from the target T; and
   a focusing lens configured to provide light condensed by the objective lens to the slit.

20. The spectrometer of claim 14, wherein the diffraction grating is any one of a transmissive diffraction grating and a reflective diffraction grating.

21. The spectrometer of claim 14, wherein the diffraction grating includes any one of a diffraction grating in a form of a concave mirror and a diffraction grating in a form of a convex lens.

22. The spectrometer of claim 14, wherein the spectrometer further comprises:
   a second reflection mirror configured to reflect $0^{th}$ order light provided from the diffraction grating back to the diffraction grating; and
   a third detection device configured to condense light, which is the reflected $0^{th}$ order light reflected by the second reflection mirror and is spectroscopically processed, and to output an electrical signal corresponding to condensed light.

23. An imaging device comprising:
   a diffraction grating configured to spectroscopically process provided light;
   a detection device configured to condense light spectroscopically processed by the diffraction grating and to output condensed light in an electrical signal; and
   an imaging unit configured to image $0^{th}$ order light output from the diffraction grating, wherein the imaging unit comprises a focusing lens configured to focus the $0^{th}$ order light,
   wherein the imaging device is configured to allow a position of the detection device to be adjusted with respect to the diffraction grating such that a light of a predetermined order provided by the diffraction grating is provided to the detection device.

24. The imaging device of claim 23, wherein the detection device comprises:
   a condenser configured to condense light spectroscopically processed by the diffraction grating; and
   a detector configured to detect light condensed by the condenser and to output detected light in an electrical signal.

25. The imaging device of claim 23, wherein the spectrometer further comprises:
   a housing;
   a slit configured to provide light into the housing; and
   a collimator configured to modify the light provided from the slit into parallel light.

26. The imaging device of claim 23, wherein the diffraction grating includes any one of a diffraction grating in a form of a concave mirror and a diffraction grating in a form of a convex lens.

27. The imaging device of claim 23, wherein the diffraction grating is any one of a transmissive diffraction grating and a reflective diffraction grating.

28. The imaging device of claim 24, wherein the imaging device further comprises a light delivery unit configured to provide light provided from a target to a slit,
   wherein the light delivery unit comprises:
   an objective lens configured to condense the light provided from the target; and
   a focusing lens configured to provide light condensed by the objective lens to the slit.

* * * * *